(12) United States Patent
Dellarole et al.

(10) Patent No.: US 11,970,779 B2
(45) Date of Patent: Apr. 30, 2024

(54) MULTILAYERED NICKEL-PHOSPHORUS COMPOSITE

(71) Applicant: ENI S.P.A., Rome (IT)

(72) Inventors: Edoardo Dellarole, San Donato Milanese (IT); Cosimo Mollica, San Donato Milanese (IT); Luca Magagnin, Rho (IT); Federico Cuneo, Binasco (IT)

(73) Assignee: ENI S.P.A., Rome (IT)

( * ) Notice: Subject to any disclaimer, the term of this patent is extended or adjusted under 35 U.S.C. 154(b) by 89 days.

(21) Appl. No.: 17/630,011

(22) PCT Filed: Jul. 24, 2020

(86) PCT No.: PCT/IB2020/057025
§ 371 (c)(1),
(2) Date: Jan. 25, 2022

(87) PCT Pub. No.: WO2021/019406
PCT Pub. Date: Feb. 4, 2021

(65) Prior Publication Data
US 2022/0259742 A1 Aug. 18, 2022

(30) Foreign Application Priority Data
Jul. 26, 2019 (IT) .......................... 102019000012972

(51) Int. Cl.
*C23C 18/32* (2006.01)
*B32B 15/04* (2006.01)
*C23C 18/16* (2006.01)

(52) U.S. Cl.
CPC ........ *C23C 18/1651* (2013.01); *B32B 15/043* (2013.01); *C23C 18/1662* (2013.01); *C23C 18/1692* (2013.01); *C23C 18/32* (2013.01)

(58) Field of Classification Search
CPC .............................. B32B 15/043; C23C 18/32
See application file for complete search history.

(56) References Cited

U.S. PATENT DOCUMENTS

| 4,358,923 | A | 11/1982 | Feldstein |
| 2007/0054126 | A1 | 3/2007 | Toyoaki et al. |
| 2009/0011136 | A1 | 1/2009 | Lancsek et al. |
| 2011/0016275 | A1 | 1/2011 | Lemonnier et al. |
| 2011/0226144 | A1 | 9/2011 | Brudermann et al. |
| 2013/0143031 | A1 | 6/2013 | Sorbo et al. |
| 2016/0010214 | A1 | 1/2016 | Morcos et al. |

OTHER PUBLICATIONS

Salicio-Paz et al., Monolayered verses multilayered electroless NiP coatings: Impact of the plating approach on the microstructure, mechanical and corrosion properties of the coatings, 2019, Elsevier, Surface & Coatings Technology 368(2019) 138-146. (Year: 2019).*
International Search Report dated Sep. 1, 2020 for PCT Appl. No. PCT/IB2020/057025.
Written Opinion dated Sep. 1, 2020 for PCT Appl. No. PCT/IB2020/057025.

* cited by examiner

*Primary Examiner* — Adam Krupicka
(74) *Attorney, Agent, or Firm* — Ruggiero McAllister & McMahon LLC

(57) ABSTRACT

An electroless composite coating has a layered structure alternating a metallic NiP layer and a composite NiP layer. A system includes the electroless composite coating and a substrate. A method of preparing the coating includes depositing a metallic NiP layer and a composite NiP layer on the substrate.

20 Claims, 2 Drawing Sheets

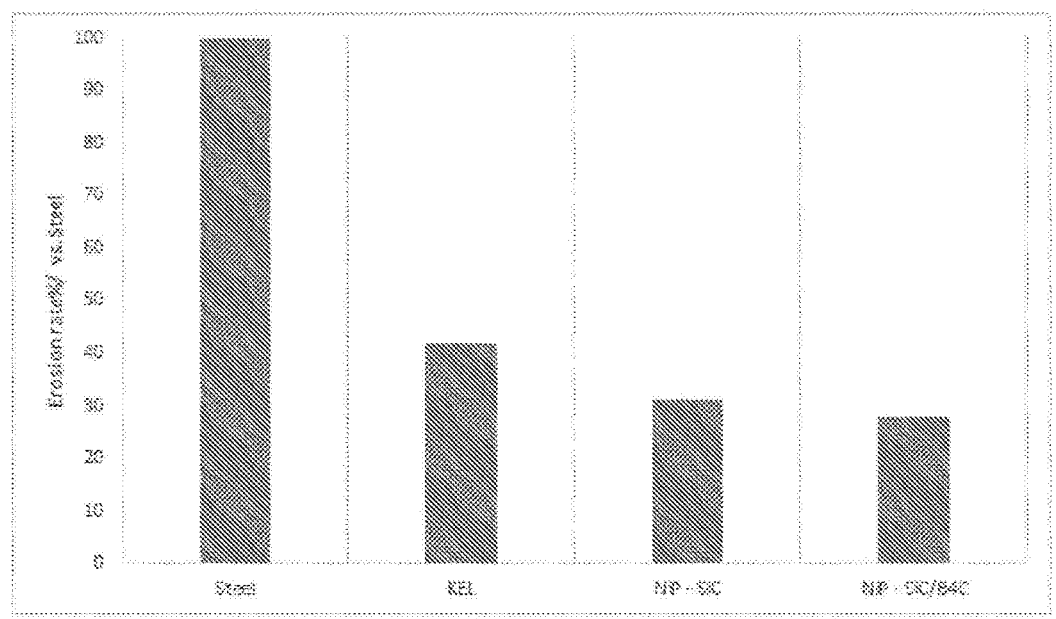
Figure 2: Erosion Test

MULTILAYERED NICKEL-PHOSPHORUS COMPOSITE

CROSS-REFERENCE TO RELATED APPLICATIONS

This Patent Application is a national stage application, filed under 35 U.S.C. § 371, of International Patent Application No. PCT/IB2020/057025, filed on Jul. 24, 2020, that claims priority from Italian Patent Application No. 102019000012972 filed on Jul. 26, 2019, the entire disclosure of each of which is incorporated herein by reference.

BACKGROUND OF THE DISCLOSURE

1. Field of the Disclosure

The disclosure provides an electroless composite coating comprising a layered structure alternating a metallic NiP layer and a composite NiP layer. The disclosure further provides a system comprising the electroless composite coating and a substrate. The disclosure further pertains to the method of preparation of said coating and its uses.

2. Description of Related Art

Solid particle erosion is material removal/damage to a solid surface produced by repeated impacts of solid particles. It is to be expected whenever hard particles are entrained in a gas or liquid medium impinging on a solid at any significant velocity. The solid-liquid erosion is known as slurry erosion. Slurry erosion has become a serious problem for the performance, reliability, and service life of slurry equipment used in many industrial applications such as: mining machinery components, hydraulic transport of solids in pipelines, marine, oil gas and power generation industries.

Electroless Ni—P coatings have been well known as a hard coating for industrial applications, due to their good corrosion and wear resistance properties. They are usually obtained by co-depositing particulate materials, such as ceramics, diamond and fluoropolymers and carbides of silicon, tungsten and chromium. This valuable process can coat not only electrically conductive materials, including graphite, but also fabrics, insulators like plastics, rubber, etc,.

Examples of electroless Ni-composite plated substrates and methods of preparations thereof are found in US 2009/0011136, US 20111/0162751, US2013/0143031, and US2016/0010214.

The major advantages of the electroless Ni—P plating deposition process include the formation of a uniform deposit on irregular surfaces, direct deposition on surface-activated non-conductors, and the formation of non-magnetic, low internal stress deposits. Furthermore, when accompanied by an appropriate post-heat treatment, the wear resistance of the coatings can be improved considerably. The effectiveness of using a composite electroless Ni—P—SiC coating system for cavitation erosion protection of steel has also been observed.

In the oil and gas field, the main application of the electroless Ni—P coatings is in the increase of wear resistance of parts in choke valves and in the protection of the inner/outer surface of the pipelines.

Pipelines play an important role throughout the world as a means of transporting gases and liquids over long distances from their source to the supply. According to the environment and to the fluid, abrasion and erosion phenomena can degrade rapidly the wall of the pipeline, losing integrity. Hence, in the oil and gas field, in particular for the coating of the inner surfaces of the pipelines, a very high wear (abrasive/erosive) resistance is required combined with an improved corrosion protection from harsh environments. However, the combination of these two properties is hard to achieve through the traditional and commercially available technology of composite electroless deposition.

In fact, the existing available processes are mainly intended for applications where wear resistance is needed and the corrosion protection is not a major issue. It is known that composite coatings are not able to offer a very high corrosion protection, typically less than the metal matrix alone.

Therefore, the need remains to provide an electroless composite with further improved erosion-corrosion resistance.

SUMMARY OF THE DISCLOSURE

The present disclosure relates to an electroless composite coating comprising a layered structure alternating a metallic NiP layer comprising Ni and P and a composite NiP layer said composite NiP layer comprising Ni, P and particles dispersed therein, wherein the dispersed particles are a blend comprising first and second particles wherein the first and the second particles are different in size and nature.

The disclosure also pertains to an electroless composite coating comprising a layered structure alternating a metallic NiP layer comprising Ni and P; a composite NiP layer comprising Ni, P and dispersed particles; and a further NiP layer or composite NiP layer.

Preferably, the composite NiP layer comprises P in amounts between 1 and 20 wt %, more preferably in an amount between 7 and 15 wt %. Ni and P together with any other metallic element, which may be present in the metallic and/or the composite layer form a so called metallic matrix. The amount of P is defined with respect to the total weight of the metallic matrix.

Preferably, the particles have an average size between 10-5000 nm, more preferably between 50-3000 nm.

When the dispersed particles are a blend comprising first and second particles different in size and nature, preferably, the first particles have an average size between 100-5000 nm, more preferably between 500-3000 nm and the second particles have an average size between 10-2000 nm, more preferably between 50-500 nm.

Advantageously, the dispersed particles are boron carbide particles and/or silicon carbide nanoparticles.

Preferably, the metallic NiP layer and the composite NiP layer comprise the same amount of P with respect to Ni.

Preferably, the composite NiP layer consists essentially of Ni and P and the dispersed particles or of Ni, P, the dispersed particles and one or more further metallic elements.

Preferably, the metallic NiP layer consists essentially of Ni and P or of Ni, P and one or more further metallic elements.

A layer alternation is defined as any alternation between a metallic and a composite layer or a composite and a metallic layer. Conveniently, the alternation occurs from 2 to 12 times, preferably from 3 to 11 times, more preferably 5, 7 or 9 times. For example, an alternation of metallic/composite/metallic layers or composite/metallic/composite accounts for 2 times (3 layers) or an alternation of composite/metallic/composite/metallic layers for 3 times (4 layers).

A coating with more than 12 alternations is still possible, however, it may become too expensive and time consuming to be produced.

Preferably, the layered structure consists of 3, 4, 5, 6, 7, 8, 9 or 10 layers, more preferably of 6, 8 or 10, even more preferably of 8 layers.

According to an embodiment of the disclosure, the electroless composite coating consists of the layered structure of alternating metallic NiP layers and composite NiP layers.

The present disclosure further provides a system comprising the electroless composite coating described above and a substrate, wherein the coating is formed over and in contact with the substrate.

Preferably, the layer formed over and in contact with the substrate is a metallic NiP layer and/or preferably the outer layer is a composite NiP layer.

The disclosure also provides a pipeline coated with the electroless composite coating as described above. Preferably, the pipeline is coated with the electroless composite coating of the disclosure in its inner surface.

The present disclosure in addition provides the use of the electroless composite coating of the disclosure to improve the resistance of a pipeline to chemical and mechanical degradation and a method to increase the corrosion resistance of a pipeline, said method comprising the step of depositing the coating according to the disclosure on the inner or the outer surface of the pipeline.

The present disclosure further provides a method to produce the system of the disclosure comprising the electroless composite coating described above. Said method comprises the following steps:
a) Substrate preparation;
b) Deposition of a metallic NiP layer, or of a composite NiP layer on the substrate,
c) Deposition of a composite NiP layer on the substrate coated with metallic NiP layer or deposition of a metallic NiP layer on the substrate coated with composite NiP layer.

Preferably, the method includes a thermal treatment comprising heating the system after deposition of at least a layer at temperatures in the range 200-600° C.

BRIEF DESCRIPTION OF THE FIGURES

FIG. 2 shows the eroded mass as a percent variation with respect to steel in an erosion test for coatings.

DETAILED DESCRIPTION OF THE DISCLOSURE

Figure 1:
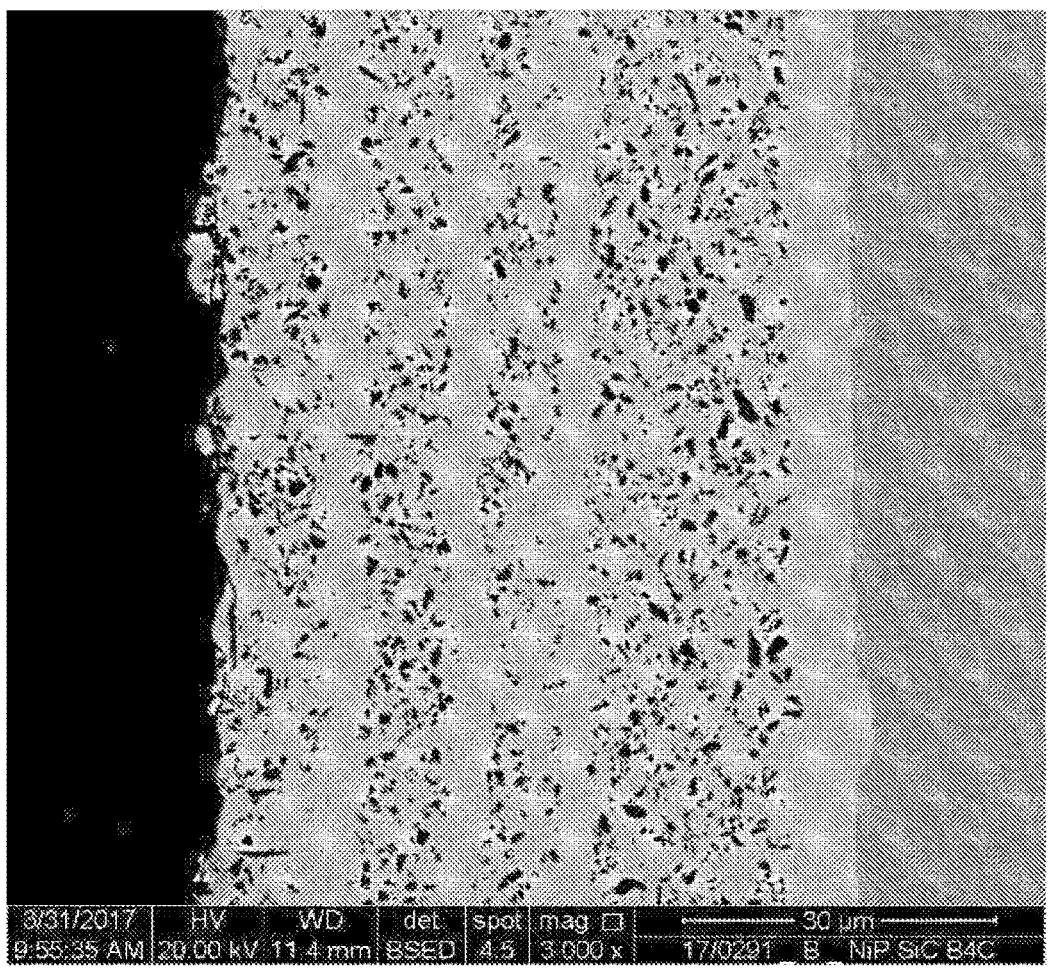
FIG. 1 shows a SEM image of sample R6 (NiP/SiC/$B_4C$).

The present disclosure relates to an electroless composite coating comprising a layered structure alternating a metallic NiP layer, comprising Ni and P and a composite NiP layer comprising Ni, P and particles dispersed therein, wherein the dispersed particles are a blend comprising first and second particles wherein the first and the second particles are different in size and nature.

Preferably, the electroless composite coating consists of a layered structure alternating a metallic NiP layer, comprising Ni and P and a composite NiP layer comprising Ni, P and particles dispersed therein, wherein the dispersed particles are a blend comprising first and second particles wherein the first and the second particles are different in size and nature, and wherein the alternation is repeated 3 to 11 times, preferably 5, 7 or 9 times.

Preferably, the electroless composite coating consists of a layered structure alternating a metallic NiP layer, comprising Ni and P and a composite NiP layer comprising Ni, P and particles dispersed therein, wherein the dispersed particles are a blend comprising first and second particles wherein the first and the second particles are different in size and nature, for a total of 4, 6, 8, 10 layers, preferably, 6, 8, even more preferably 8.

The disclosure also pertains to an electroless composite coating comprising a layered structure alternating a metallic NiP layer comprising Ni and P; a composite NiP layer comprising Ni, P and dispersed particles; and a further NiP layer or composite NiP layer. Namely, the electroless composite coating comprises or preferably consists of a single or repeated layered structure of metallic NiP/composite NiP/metallic NiP layers or composite NiP/metallic NiP/composite NiP layers.

The metallic NiP layer is different from the composite NiP layer. Preferably, the metallic NiP layer does not contain any particles dispersed therein.

Preferably, the metallic NiP layer and/or the composite NiP layer comprises P in amounts between 1 and 20 wt %, more preferably in an amount between 7 and 15 wt %.

Ni and P together with any other metallic element, which may be present in the metallic and/or the composite layer, form a so called metallic matrix. The amount of P is defined with respect to the total weight of the metallic matrix.

The metallic NiP layer comprises, and preferably consists of, Ni and P. The metallic NiP layer may also contain other suitable metallic elements, e.g. tungsten, cobalt, copper, etc., according to the known art on anticorrosive blends and alloys, in amounts between 0.1 wt %. and 30 wt % with respect to the total weight of the metallic matrix of the metallic NiP layer.

The composite NiP layer comprises, and preferably consists of, Ni, P and particles dispersed therein in amounts between 0.1% vol. and 50% vol., preferably between 10% vol. and 40% vol., with respect to the total volume of the layer, as measured by image analysis of the cross section of the composite layer.

The composite NiP layer may also contain other suitable metallic elements, e.g. tungsten, cobalt, copper, etc., in amounts between 0.1% wt. and 30% wt., according to the known art on anticorrosive blends and alloys, in amounts between 0.1 wt %. and 30 wt % with respect to the total weight of the metallic matrix of the composite NiP layer.

Particle content in the layer is estimated by analysing the images of the sections obtained from optical or SEM microscopy via the "Image J" software.

Preferably, the metallic NiP layer and the composite NiP layer comprise the same amount of Ni and or P.

Preferably, the composite NiP layer comprises and more preferably consists of the metallic matrix of the metallic NiP layer and of the dispersed particles.

When the dispersed particles are a blend comprising first and second particles different in size and nature, the blend may comprise further particles, which may be different in size and nature from first and second particles or the further particles may be different in nature but have the same size of the first or the second particles. However, the blend of dispersed particles preferably consists of the first and second dispersed particles.

Particles can be of metallic, ceramic, carbon or polymeric materials. Preferably, the particles are ceramic particles, more preferably ceramic particles with a hardness of 8 or higher in the Mohs scale. Examples of suitable ceramic particles are made of zirconia, silicon nitride, tungsten carbide, titanium nitride, silicon carbide, zirconium carbide, alumina, boron carbide, boron nitride, or diamond. More preferably, the particles are boron carbide and/or silicon carbide nano- and micro-particles.

Preferably, the dispersed particles have an average size between 10 and 5000 nm.

Preferably, the first particles have an average size between 200 and 5000 nm and more preferably between 500 and 3000 nm.

Preferably, the second particles have an average size between 10 and 2000 nm, more preferably between 50 and 500 nm.

Preferably, the first particles have a size larger than the second particles. More preferably, the first and second particles have a difference in average sizes of at least 100 nm, more preferably in the range 300-1500 nm.

More preferably, the first particles are boron carbide particles and have an average size between 500-3000 nm and the second particles are silicon carbide nanoparticles and have an average size between 50 and 500 nm.

The average size of the particles is measured according to the standard ISO 9276-2:2001.

Preferably, the first particles are dispersed in the composite layer matrix in amounts between 10% vol. and 40% vol. with respect to a total volume of the composite layer, more preferably between 10% vol. and 30% vol.

Preferably, the second particles are dispersed in the composite layer matrix in amounts between 0.1% vol. and 30% vol. more preferably between 1% vol. and 20% vol. with respect to the total volume of the composite layer.

Preferably, the volume ratio between the first and second particles dispersed in the matrix is within the range from 0.8 to 50, more preferably from 1 to 10.

The thickness of the multilayer composite coating may range from 1 to 150 µm, preferably in the range 50-80 µm. Preferably, the metallic NiP and composite NiP layer has a thickness in the range of 500 nm-100 µm, more preferably in the range of 1 to 50 µm. The metallic and the composite layers may have different thicknesses from one another.

Conveniently, the alternation is applied from 2 to 11 times, preferably 5, 7 or 9 times.

Preferably, the layered structure consists of 3, 4, 5, 6, 7, 8, 9 or 10 layers, more preferably of 6, 8 or 10 layers, even more preferably of 8 layers.

Preferably, the electroless composite coating consists of alternating metallic NiP layers and composite NiP layers as described above.

The multi-layered composite coatings can be thermally treated after deposition to improve their mechanical properties, such as hardness. Thermal treatment can be applied for 1 to 8 hours in the temperature range 250-550° C. Programmed heating profiles may be applied, according to known methods in the art.

The present disclosure further provides a system comprising the electroless composite coating described above and a substrate, wherein the coating is formed over and in contact with the substrate.

Preferably, the layer formed over and in contact with the substrate is a metallic NiP layer and/or preferably the outer layer is a composite NiP layer.

The substrate can include metals and their alloys, carbon and ceramic materials, and polymeric ones. Preferably, the substrate is metallic or is plate plated with a metallic layer for subsequent electroless nickel plating thereon. The substrate may be selected from steel, brass, aluminium, aluminium alloy, copper, titanium, titanium alloy, iron, nickel, nickel alloy, bronze, stainless steel or combinations thereof. The substrate is preferably steel.

According to a preferred configuration, the first layer facing the substrate is a metallic NiP layer, while the outer one is a composite NiP layer.

The disclosure also provides a pipeline coated with the electroless composite coatings described above. Preferably, the pipeline is coated with the electroless composite coating of the disclosure in its inner surface.

The disclosure further provides a method to produce the system of the disclosure comprising the electroless composite coating described above. Said method comprises the following steps:
a) Substrate preparation, which preferably comprises cleaning the substrate surface, e.g. from organic residues and oxides. Preferably, standard degreasing and etching solutions are used.
b) Deposition of a metallic NiP layer, or of a composite NiP layer on the substrate, said deposition preferably comprising contacting, preferably by immersion, the substrate with a NiP based solution to deposit the metallic NiP layer, or with a NiP based solution containing particles to deposit the composite NiP layer;
c) Deposition of a composite NiP layer on the substrate coated with metallic NiP layer or deposition of a metallic NiP layer on the substrate coated with composite NiP layer, said deposition preferably comprising contacting, preferably by immersion, the coated substrate with a NiP based solutions to deposit the metallic NiP layer or, respectively, with a NiP based solutions containing particles to deposit the composite NiP layer;

Step c) may be repeated as many time as necessary as long as the alternating metallic NiP layer/composite NiP layer or composite NiP layer/metallic NiP layer is maintained. Preferably, step c) is repeated from 2 to 10 times, more preferably from 5 to 9 times.

According to an embodiment of the present disclosure, any or each step b) or c) of the method to produce the electroless coated system may be carried out by more than one coating phase in sequence, possibly in more than one batch. Coating steps carried out in multiple phases may be needed, e.g. for obtaining a thicker layer, e.g. 3000 nm.

Optionally, step a) of the method includes substrate activation, following substrate preparation. The activation may be achieved by palladium activation, electrochemical activation or by contact with less noble materials.

Preferably, a washing step with water or an aqueous liquid is carried out at the end of step b) or each step c).

Optionally, the method includes a thermal treatment heating the system after deposition of at least a layer, preferably after all the layer have been deposited. The thermal treatment improves the mechanical properties of the system and of the electroless coating. Thermal treatment is preferably carried out at temperatures in the range 200-600° C., more preferably in the range 250-550° C.

NiP based solutions for electroless plating, suitable for carrying out either step b) or step c), are well known in the art and may be commercially available. They normally comprise compositions of at least a soluble Ni salt, e.g. a sulphate, and at least an ipophosphite salt. Several other components such as inhibitors, hydrogen absorbers, buffer systems, catalysts or other metal salts may be present.

Examples of electroless plating are described in "Glenn O. Mallory, Juan B. Hajdu, Electroless Plating: Fundamentals and Applications, AESF 1990".

In step b) or c), suitable particles in a convenient amount are suspended in the NiP solution, in order to achieve the desired amount of particles mixed with the NiP matrix in the composite layer. A preferred concentration of particles in the suspensions is in the range 1-10 g/L. Surfactants may also be present in order to stabilize the suspension. Suspended particles in step b) or c) have size and distribution according to the size and distribution of particles in the composite NIP layer of the desired coating of the present disclosure and are preferably SiC particles with an average size from 50 to 500 nm or $B_4C$ particles with an average size from 500 to 3000 nm.

Steps b) and c) are preferably carried out at a temperature from 55° C. to 98° C., more preferably from 70 to 95° C. A preferred deposition time of each step is from 1 min. to 60 min., more preferably from 5 min. to 20 min. Different thicknesses of each layer may be obtained by varying the time and temperature of the electroless plating step.

According to a preferred embodiment, step b) is a deposition of a metallic NiP layer and step c) is first carried out as a deposition of a composite NiP layer and then repeated an even number of times, preferably 4, 6 or 8 times, maintaining alternation of metallic and composite layer deposition, in order to obtain a composite outer layer.

The disclosure further provides a pipeline coated with the electroless composite coating described above. Preferably the pipeline is coated on its inner surface.

The disclosure further pertains to the use of the electroless composite coating described above for increasing corrosion resistance of pipelines.

Still further the disclosure provides a method to increase the corrosion resistance of a pipeline, said method comprising the step of depositing the coating of the disclosure on the inner or the outer surface of the pipeline.

Examples

Samples as described is table 1 were prepared. All samples R1-R6 have an alternating multilayer of metallic NiP layer and composite NiP layer structure. In R1, R3 and R5, the composite NiP layers contain a single type of dispersed particles. Samples R2, R4 and R6 contain a blend of first and second dispersed particles. KEL is a commercial coating, which consists of a layer of 30 µm NiP with on top a layer of 20 µm NiP/SiC with submicron SiC particles.

The total amount of co-deposited particles in the composite NiP layer is about 25% vol. (evaluated by image analysis of the cross section of the composite layer) with P content in both the metallic and composite layers of 10% wt.

TABLE 1

| Sample name | Coating's material | Notes |
|---|---|---|
| R1 | NiP + NiP/SiC on bare unpolished X60 steel with Pd activation | Thermally treated 1 h at 400° C. |
| R2 | NiP + NiP/SiC/$B_4C$ on bare unpolished X60 steel with Pd activation | |
| R3 | NiP + NiP/SiC on lapped X60 | |
| R4 | NiP + NiP/SiC/$B_4C$ on lapped X60 | |
| R5 | NiP + NiP/SiC | Thermally treated 1 h at 400° C. |
| R6 | NiP + NiP/SiC/$B_4C$ | Thermally treated 1 h at 400° C. |
| KEL | Commercial coating (NiP + NiP/SiC) | Thermally treated 1 h at 400° C. |
| X60 | Carbon steel API 5L X60 | Substrate |

Plating Electrolytes

The results presented are based on the use of Tecnoplate 3000® commercial formulation (provided by Tecnochimica SpA) with addition of SiC nanoparticles having an average size of 100 nm and $B_4C$ submicron particles having an average size of 800-1000 nm, with the following concentration in the bath 2 g/l and 4 g/l, respectively, when a first and second particle type is used.

Typical deposition parameters are:
pH=4.8 and T=90° C.;
Deposition total time=2-4 hours;
Thickness of the entire structure for all the samples=50 µm
Particles total concentration in the bath=6 g/l
Post thermal treatment=400° C. for 1 hour Sample Preparation Protocol Steel substrate was sonicated in acetone for 10 minutes, rinsed thoroughly, etched in sulphuric acid concentrated at 20% for 5 minutes and rinsed again. Tecnoplate 3000® was formulated according to the Tecnochimica guidelines; for composite plating, the selected amount of powders was added to the above cited solution and the batch was sonicated for 15-20 minutes. Activated steel was then immersed for 15 minutes in a metallic plating solution at 85° C. to deposit a seed layer of NiP alloy. NiP plated substrate was then rinsed with water and immersed in the composite plating bath with Silicon Carbide or a mixture of Silicon Carbide and Boron Carbide for 2 hours at 85-90° C.; the composite layer was then plated with NiP by immersing the sample in the metallic Tecnoplate solution for 10 minutes at 85° C. Composite plating and NiP plating steps have been repeated alternatively to obtain the final coating with 8 alternating layers (except sample KEL), the outer surface thereof being a composite layer.

At the end of the treatment, samples appeared dull and dusky; surface smoothing with abrasive paper was indeed carried out to obtain a polished surface. Final thermal heating, when applied, was carried out by holding the coated plates at 400° C. in air for 1 hour as thermal treatment.

The samples were characterized according to the following procedures:

Coating Characterization

FIG. 1 shows a Scanning Electron Microscope (SEM) image of sample R6 (NiP/SiC/$B_4C$).

Morphological characterization of composite coatings shows the typical features of composite materials. Surface appearance, if not lapped, is dull and matt, while cross section observations show a two phases structure constituted by the NiP alloy metal matrix and the dispersion phase, i.e. SiC or mixture of SiC and $B_4C$. A multilayer structure due to NiP and composite layer alternation is also observed.

The NiP matrix is obtained in a high phosphorus plating electrolyte with P content in the matrix typically, 10% by weight.

The crystalline structure evolution (XRD) with thermal treatment at various temperature between 300-500° C. for 1 hour shows the initial amorphous structure evolves into a crystalline one constituted by metallic Ni and hard $Ni_xP_y$ intermetallic compounds.

Micro-Hardness

Table 2 reports the results of the micro-hardness measurements performed on sections of the samples described above. The thickness of the coatings (ranging from 50-200 µm) and the morphology of the coatings has required the use of micro-indentation (100 g weight).

Surface Texture

Table 2 also reports the results 'Surface texture' (Sa) measurements obtained by optical digital microscopy.

Erosion Characterization

Erosion tests have been performed in an experimental station composed of a mixing tank, a centrifugal pump and a test tank containing the nozzle and the sample, using a slurry prepared by mixing water and sand. Commercial sand was used, named "Impalpabile" from Sabbie Sataf (size <400 µm).

The nozzle is made of tungsten carbide with a cylindrical shape and an internal diameter of 8 mm.

Previously weighed samples (6.9×7.5×0.4 cm) were subjected to a slurry high-pressure perpendicular jet from the nozzle, for a variable duration time comprised between 2 and 5 minutes. The slurry is continuously circulated from the mixing tank through the centrifugal pump to the nozzle in the test tank and then back to the mixing tank. The nozzle is placed within the test tank at a distance of 20 mm from the surface of the sample to be tested, with the jet directed perpendicularly to the surface. Both the nozzle and the sample are completely sunk in the slurry so that no gas is entrained by the jet. After the test, each sample is washed, rinsed and weighed again.

The erosion factor has been calculated as $ER=\Delta M/\rho_s QCT$, wherein:

$\Delta M$ Mass lost from the sample during the test
T Test time
$\rho_s$ Density of solids in the mixture
Q Flow rate
C volumetric concentration of solids in the mixture
v Jet Speed
ER Erosion Ratio For each material the average ER is calculated from ER measured on samples tested at 2, 3 and 5 minutes duration time respectively.

FIG. 2 reports the percentage erosion rate with respect to steel for erosion tests in experimental conditions (Test 2) reported below in order to highlight the behaviour of the coating only for composite coatings from (NiP—SiC; NiP—SiC/B$_4$C) and commercial KEL (KEL), with total thickness of the coating 50 µm and for carbon steel for comparison:

Test 2 conditions were:
v=35 m/s
Distance sample—nozzle: 20 mm
$\rho_s$=1560 kg/m$^3$
C=1.2% vol/vol These operating conditions lead to the erosion of the coating alone, with minor contribution from the substrate.

If the behaviour of the coatings only is emphasized, NiP—SiC-B$_4$C composite coating shows an erosion resistance slightly higher than the NiP—SiC and it is able to reduce the amount of eroded material with respect to the steel substrate.

Corrosion Test in 'SOUR' Environment

Corrosion resistance has been evaluated through exposure tests in sour environments. The behaviour of the coatings (R5, R6, on steel API 5L X60 was compared with reference materials, i.e. bare API 5L X60. Corrosion was evaluated observing the formation of corrosion products after the test on Miller shaped samples.

Tests in sour environments were performed by contact with salt solutions, hydrogen sulfide 3% and carbon dioxide 13%.

In a pressurized chamber in Hastelloy C276 (volume 1 liter), previously weighed samples (Miller Test blocks, 2.5× 1.3×0.5 cm) were immersed in 300 mL water solution containing 30 g/l of chlorides as NaCl. After closing the pressurized chamber, a gas mixture containing (by vol.): H$_2$S 3%, CO$_2$ 13%, N$_2$ 85% was charged under heating until the following conditions were reached:

temperature 90° C.
pressure 100 bar

The samples were maintained under these conditions for a duration of 7 days.

For the bare steel X60 the test lasted only 24 hours due to the fast degradation of the materials. At the end of each test, weight losses have been evaluated and summarized in the following table 2.

The Miller Test for Abrasion Resistance

Miller tests have been performed in a Miller Machine with four plastic trays, according to ASTM G75 (Standard), using a slurry prepared by mixing water and sand in the ratio 1/1. Commercial sand was used, named "Impalpabile" from Sabbie Sataf (size <400 µm). The MN number of this slurry with the reference material (steel Fe—27Cr) is 156. The bottom of each tray in the machine was covered with a rubber lap of neoprene (Modified MIL-R-855C, Class 2, Grade 80). Before test, each sample (Miller metal block 2.5×1.3×0.5 cm) is washed and sonicated in water, then degreased with acetone, dried in a nitrogen stream and weighed (0.1 mg precision) and placed on the arm in the tray.

The applied load on standard Miller block samples was 22.24 N. Miller tests and SAR numbers were performed and calculated according to the standard for the coatings and a reference material (Steel Fe—27Cr). For the NiP coatings, a specific weight of 7.75 g/cm$^3$ was used.

In order to most appropriately apply the Miller test to coated samples, suitable conditions were selected whereby erosion was essentially limited to the coating layer, without abrading the less resistant below carbon steel. Therefore, the Mille Number was calculated as the tangent slope of the interpolation at 40 minutes instead of two hours as requested by the standard procedure. It was checked that in such conditions, less than 30% of the surface of each sample showed exposed metal substrate. In this way, only the abrasion resistance of the coating was measured.

Miller test was also performed on two samples of examples R5 and R6 previously submitted to the corrosion test (examples R5C and R6C respectively).

Results

Characterization results are reported on Table 2.

TABLE 2

| | R1 | R2 | R3 | R4 | R5 | R6 | R5C | R6C | X60 | KEL |
|---|---|---|---|---|---|---|---|---|---|---|
| Average Microhardness (12 meas.) | | | | | 820 | 750 | | | 150 | |
| Average Roughness | | | | | 2.2 | 2.2 | | | | |
| Average velocity of corrosion (2 meas.) (mm/y) | | | | | <0.002 | <0.002 | | | 1.9 | |
| Miller test (Slope at 40 min.) | 1109 | 724 | 853 | 718 | 1326 | 1254 | 1099 | 904 | 3986 | 1689 |

On the basis of the acquired data, it can be concluded that all the tested coatings have a better abrasion resistance than steel X60 (used as substrate).

The corrosion treatment (samples R5C and R6C) does not decrease the abrasion resistance of the coatings. On the contrary, a surprising improvement was seen.

According to the SAR results (t =40 minutes for samples with abrasion of the coating lower than 30%) the best coatings appear to be NiP/SiC/B$_4$C (R2, R4, R6 and R6C); the last two positions are for of commercial coating KEL and the substrate (X60).

As far as the corrosion test is concerned, all the coatings of the disclosure show an excellent corrosion resistance. The corrosion velocity is always well below 0.1 mm/year (which defines the suitability of the metallic material used in the sector Oil&Gas). This is a particularly lower value considering the thickness of the coatings (between 50-200 μm). It can be assumed that in aggressive conditions ('sour') the coating could withstand an even longer period. It shall also be noted that the corrosion resistance of this sample is superior than the one of WC, widely used for Oil & Gas applications.

The low corrosion resistance featured by the steel substrate underlines the importance of having an optimal adherence of the coating to the substrate. A detachment caused by accidental reasons would compromise the excellent corrosion resistance performances of the coating.

Morphology studies done by SEM have demonstrated that NiP/SiC and NiP/SiC/B$_4$C have generally regular morphology.

The invention claimed is:

1. An electroless composite coating, the coating comprising:
    a layered structure alternating a metallic NiP layer comprising Ni and P and a composite NiP layer,
    wherein the composite NiP layer comprises Ni, P and dispersed particles,
    wherein the dispersed particles are a blend comprising first and second particles, and
    wherein the first and the second particles are different in size and nature.

2. The electroless composite coating according to claim 1, wherein the metallic NiP layer and/or the composite NiP layer comprises P in an amount from 1 to 20 wt % with respect to a total weight of a metallic matrix in the layer.

3. The electroless composite coating according to claim 1, wherein the first particles have an average size of 500-3000 nm and the second particles have an average size of 50-500 nm.

4. The electroless composite coating according to claim 1, wherein the first and/or the second particles are boron carbide particles and/or silicon nanoparticles.

5. The electroless composite coating according to claim 1, wherein the metallic NiP layer consists essentially of Ni and P or of Ni, P and one or more further metallic element.

6. The electroless composite coating according to claim 1, wherein the composite NiP layer consists essentially of Ni and P and the blend of dispersed particles, or of Ni, P, the blend of dispersed particles and one or more further metallic element.

7. The electroless composite coating according to claim 1, wherein the alternation occurs 3 to 11 times.

8. The electroless composite coating according to claim 1, wherein the alternation occurs 5 to 9 times.

9. The electroless composite coating according to claim 1, wherein the alternating occurs 7 times.

10. An electroless composite coating, the coating comprising:
    a layered structure alternating a metallic NiP layer comprising Ni and P;
    a composite NiP layer comprising Ni, P and dispersed particles; and
    a further NiP layer or composite NiP layer.

11. A system comprising the electroless composite coating according to claim 1 and a substrate, wherein the coating is formed over and in contact with the substrate.

12. The system according to claim 11, wherein the coating that is formed over and in contact with the substrate is a metallic NiP layer.

13. The system according to claim 11, wherein the system has an outer layer that is a composite NiP layer.

14. A pipeline, wherein the pipeline is coated with the electroless composite coating according to claim 1.

15. The pipeline according to claim 14, wherein the pipeline is coated on an inner surface thereof.

16. A method to improve the resistance of a pipeline to chemical and mechanical degradation, the method comprising: applying the coating according to claim 1 to the pipeline.

17. A method to produce the system of claim 11, comprising the following steps:
    a) preparing a substrate;
    b) depositing a metallic NiP layer, or a composite NiP layer on the substrate,
    c) depositing a composite NiP layer on the substrate coated with metallic NiP layer or depositing a metallic NiP layer on the substrate coated with composite NiP layer.

18. The method according to claim 17, wherein step c is repeated as many times as necessary as long as the alternation metallic NiP layer/composite NiP layer or composite NiP layer/metallic NiP layer is maintained.

19. The method according to claim 17, wherein step c is repeated 2 to 10 times.

20. The method according to claim 17, the method further comprising:
 applying a thermal treatment by heating the system at a temperature in the range of 200-600° C. after depositing at least a first layer.

* * * * *